US011656983B2

(12) United States Patent
Balluchi et al.

(10) Patent No.: US 11,656,983 B2
(45) Date of Patent: May 23, 2023

(54) HOST-RESIDENT TRANSLATION LAYER WRITE COMMAND

(71) Applicant: Micron Technology, Inc., Boise, ID (US)

(72) Inventors: Daniele Balluchi, Milan (IT); Dionisio Minopoli, Frattamaggiore (IT)

(73) Assignee: Micron Technology, Inc., Boise, ID (US)

( * ) Notice: Subject to any disclaimer, the term of this patent is extended or adjusted under 35 U.S.C. 154(b) by 60 days.

(21) Appl. No.: 17/302,966

(22) Filed: May 17, 2021

(65) Prior Publication Data

US 2021/0334205 A1     Oct. 28, 2021

Related U.S. Application Data

(63) Continuation of application No. 15/929,320, filed on Apr. 24, 2020, now Pat. No. 11,036,625.

(51) Int. Cl.
*G06F 12/02*     (2006.01)
*G06F 12/1045*     (2016.01)
*G06F 12/0868*     (2016.01)

(52) U.S. Cl.
CPC ...... *G06F 12/0246* (2013.01); *G06F 12/0868* (2013.01); *G06F 12/1054* (2013.01); *G06F 12/1063* (2013.01); *G06F 2212/7201* (2013.01)

(58) Field of Classification Search
CPC ............. G06F 12/0246; G06F 12/0868; G06F 12/1054; G06F 12/1063
See application file for complete search history.

(56) References Cited

U.S. PATENT DOCUMENTS

| | | | |
|---|---|---|---|
| 8,041,878 B2 | 10/2011 | Lee | |
| 10,474,374 B2 | 11/2019 | Choi et al. | |
| 10,635,584 B2 | 4/2020 | Widder et al. | |
| 10,852,964 B2 | 12/2020 | Grosz | |
| 11,226,907 B2* | 1/2022 | Palmer | G06F 21/79 |
| 2017/0109089 A1 | 4/2017 | Huang | |
| 2017/0192902 A1 | 7/2017 | Hwang et al. | |
| 2020/0201784 A1 | 6/2020 | Palmer | |

* cited by examiner

*Primary Examiner* — Tammara R Peyton
(74) *Attorney, Agent, or Firm* — Lowenstein Sandler LLP

(57) ABSTRACT

A processing device in a memory system receives, from a host system, a host-resident translation layer read command comprising a physical address of data to be read from a memory device, wherein the physical address is indicated in at least a portion of a translation layer entry previously provided to the host system with a response to a host-resident translation layer write command and stored in a host-resident translation layer mapping table. The processing device further performs a read operation to read the data stored at the physical address from the memory device and sends, to the host system, the data from the physical address of the memory device.

20 Claims, 6 Drawing Sheets

HOST-RESIDENT TRANSLATION LAYER WRITE COMMAND

RELATED APPLICATION

This application is a continuation of U.S. patent application Ser. No. 15/929,320, filed Apr. 24, 2020, which is hereby incorporated in its entirety herein by reference.

TECHNICAL FIELD

Embodiments of the disclosure relate generally to memory sub-systems, and more specifically, relate to a host-resident translation layer write command for memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
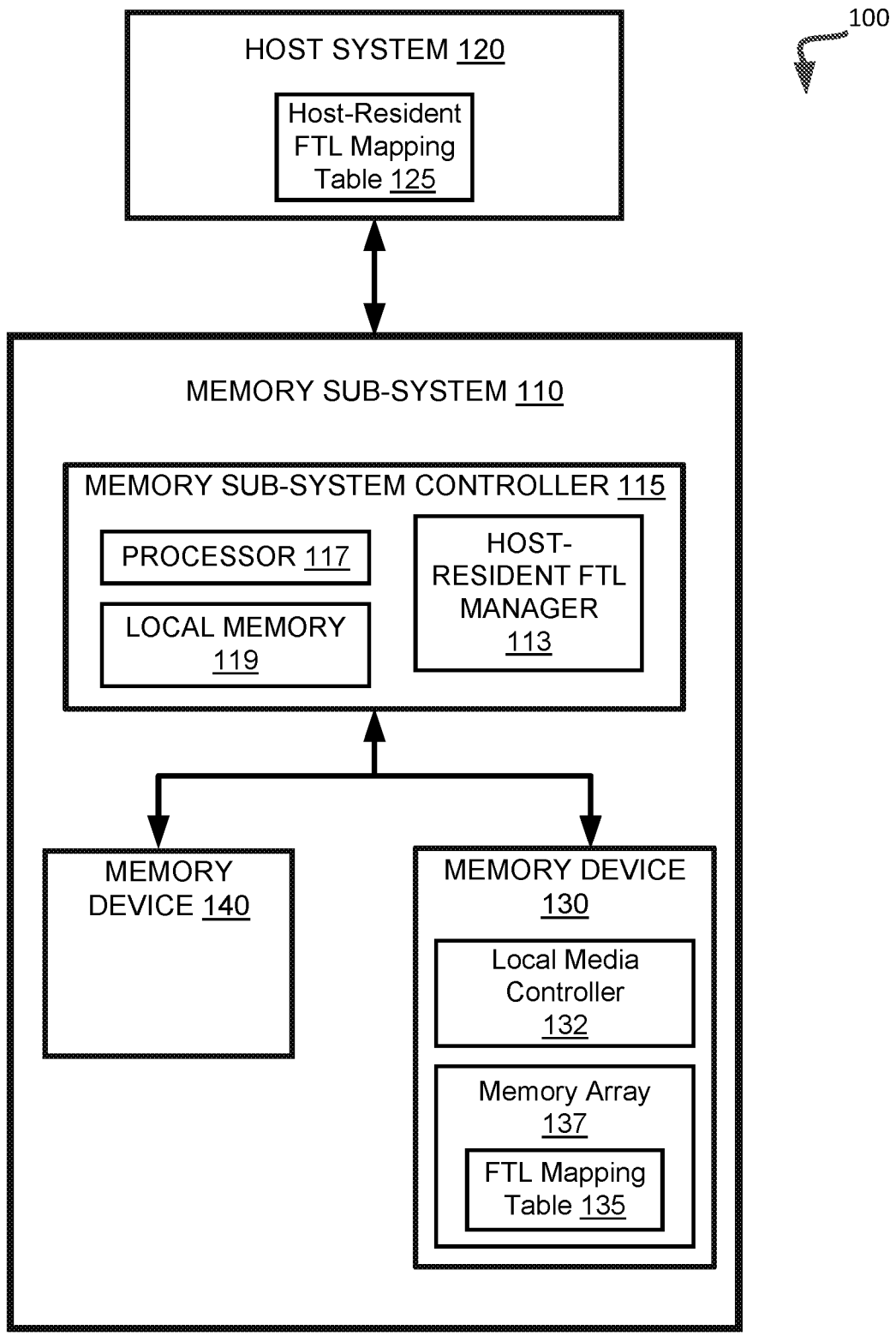
FIG. 1 illustrates an example computing system that includes a memory sub-system in accordance with some embodiments of the present disclosure.

Aspects of the present disclosure are directed to a host-resident translation layer write command for memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a negative-and (NAND) memory device. Other examples of non-volatile memory devices are described below in conjunction with FIG. 1. A non-volatile memory device is a package of one or more die. Each die can consist of one or more planes. For some types of non-volatile memory devices (e.g., NAND memory devices), each plane consists of a set of blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Certain non-volatile memory devices use a Flash Translation Layer (FTL) to translate logical addresses of memory access requests, often referred to as logical block addresses (LBAs), to corresponding physical memory addresses, which can be stored in one or more FTL mapping tables. LBAs can be the logical addresses used by a host system for managing data. Many memory sub-system controllers often lack sufficient memory to maintain an entire FTL mapping table in a cache. Therefore, portions of the FTL mapping table can be retrieved from the memory device on demand, which can cause random read performance degradation. In some instances, the FTL mapping table can be referred to as a logical-to-physical (L2P) mapping table storing L2P mapping information.

In order to improve random read performance, certain host systems utilize host-resident memory as a cache for at least a portion of the FTL mapping table, for example in conjunction with the Host Performance Booster (HPB) feature of the JEDEC standard. Since the host-resident memory is limited, only some subset of the entire FTL mapping table is maintained by the host system. This host-resident FTL mapping table can be referred to in some instances as an HPB entry table. FTL data can be read from this host-resident memory faster than from the memory device, and the host system can initiate a memory operation by retrieving, from the host-resident memory, a physical block address (PBA) of data stored in the memory device and including the PBA in a memory access request conveyed to the memory sub-system. The PBA can be retrieved by the host system from the host-resident memory using the LBA of the host data. Upon receiving the memory access request, the memory sub-system can immediately retrieve the data associated with the physical address from the memory device without the delay associated with accessing the flash memory-based FTL mapping table and using the LBA to obtain the physical address.

Any time the host system writes data to the LBAs which are represented in the FTL mapping information cached in the host-resident memory, the corresponding physical addresses are changed. In addition, the memory sub-system can regularly perform certain memory management operations (e.g., garbage collection) which results in data being rewritten to a new physical address. Accordingly, the portion of the FTL mapping table cached in the host-resident memory regularly becomes invalid. During any typical workload with mixed read and write operations to the same region of LBAs, the invalidation of the logical to physical mappings in the FTL mapping table is very frequent. As a result, the host system might issue read commands with an invalid PBA or have to request updated FTL mapping information to replace the host-resident FTL mapping information (e.g., issue an HPB Read Buffer command). Either situation results in increased data traffic between the host system and memory sub-system, increased latency in servicing memory access requests, decreased quality of service for the host system, and an increase in unnecessary operations performed by the memory sub-system.

Aspects of the present disclosure address the above and other deficiencies by implementing a host-resident translation layer write command for memory sub-systems. In one embodiment, the host system can issue the host-resident translation layer write command when writing data to a LBA for which the FTL mapping information is presently cached in the host-resident memory (i.e., when writing data to an "active" sub-region of the logical address space of the memory device). The memory sub-system controller receives the host-resident translation layer write command and performs a write operation to write the data associated with the LBA to a physical address of the memory device. The memory sub-system controller further updates a translation layer entry corresponding to the LBA to include the physical address and sends, to the host system, a response to the host-resident translation layer write command. The response includes the updated translation layer entry with the updated physical address. The host system can store the updated translation layer entry with the physical address in a host-resident translation layer mapping table stored in host-resident memory. Thus, the host-resident translation layer mapping table maintains up-to-date FTL mapping information for the corresponding sub-region of the memory device. Subsequently, if the host system issues a host-resident translation layer read command, the host system can include the updated physical address, thereby allowing the memory sub-system to perform a read operation without having to access the flash memory-based FTL mapping table.

Using the host-resident translation layer write command results in an increase of HPB read commands that deliver valid physical addresses stored in the host-resident FTL mapping table. Accordingly, the number of HPB read buffer commands that update the host-resident FTL mapping table with updated physical addresses corresponding to the LBAs stored therein are decreased. Together, these factors result in decreased data traffic between the host system and memory sub-system, decreased latency in servicing memory access requests, increased quality of service for the host system, and a decrease in unnecessary operations performed by the memory sub-system, allowing bandwidth to be made available for performing other operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110. In one embodiment, host system 120 includes host-resident FTL mapping table 125.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells, such as memory array 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. In addition, in one embodiment, memory array 137 can include FTL mapping table 135.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 132 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

In one embodiment, the memory sub-system 110 includes a host-resident FTL manager component 113 that coordinates use of the host-resident FTL mapping table 125 and the processing of corresponding host-resident translation layer commands, including a host-resident translation layer write command. In one embodiment, host-resident FTL manager component 113 receives, from host system 120, a host-resident translation layer write command requesting that data associated with a LBA to be written to memory device 130. In one embodiment, host system 120 issues the host-resident translation layer write command when writing data to a LBA for which the FTL mapping information is presently cached in host-resident FTL mapping table 125. In response, host-resident FTL manager component 113 performs a write operation to write the data associated with the LBA to a physical address of memory device 130 (i.e., in memory array 137). Host-resident FTL manager component 113 updates a translation layer entry corresponding to the LBA to include the physical address. In one embodiment, host-resident FTL manager component 113 updates the translation layer entry in flash-based FTL mapping table 135. Host-resident FTL manager component 113 sends, to host system 120, a response to the host-resident translation layer write command. The response includes the updated translation layer entry with the updated physical address. Host system 120 can store the updated translation layer entry with the physical address in a host-resident FTL mapping table 125. Thus, host system 120 can maintain up-to-date FTL mapping information in host-resident FTL mapping table 125 for the active sub-region of memory device 130. If host system 120 subsequently issues a host-resident translation layer read command, host system 120 can include the updated physical address from host-resident FTL mapping table 125, thereby allowing memory host-resident FTL manager component 113 to perform a read operation on the memory array 137 of memory device 130 without having to access the flash memory-based FTL mapping table 135. Further details with regards to the operations of the host-resident FTL manager 113 are described below.

In some embodiments, the memory sub-system controller 115 includes at least a portion of the host-resident FTL manager component 113. For example, the memory sub-system controller 115 can include a processor 117 (processing device) configured to execute instructions stored in local memory 119 for performing the operations described herein. In some embodiments, the host-resident FTL manager component 113 is part of the host system 110, an application, or an operating system.

Figure 2:
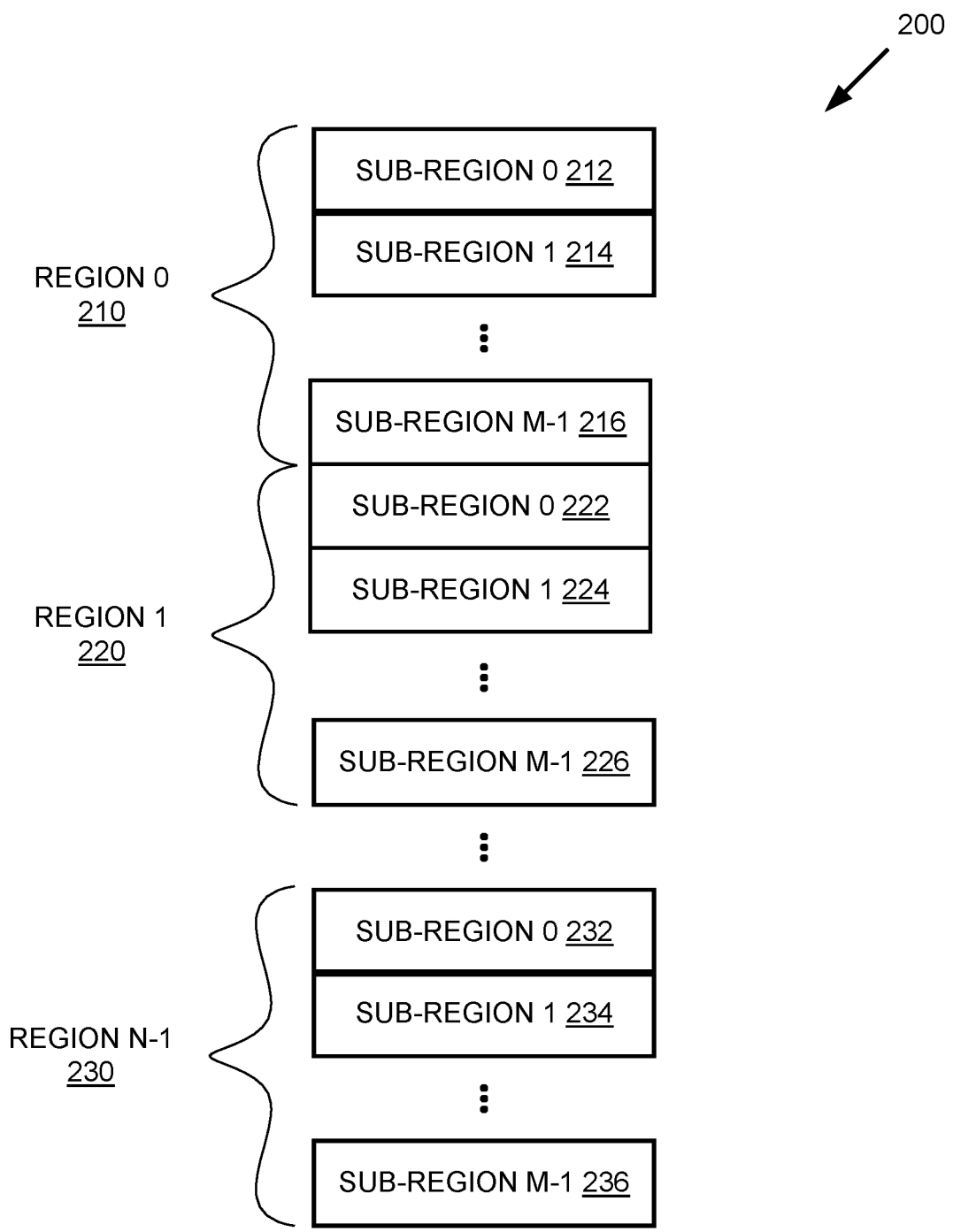
FIG. 2 is a block diagram illustrating a logical address space of a memory device divided into regions in accordance with some embodiments of the present disclosure.

FIG. 2 is a block diagram illustrating a logical address space 200 of a memory device 130 divided into regions in accordance with some embodiments of the present disclosure. In one embodiment, the logical address space is divided into a number of separate regions, which can also be referred to as HPB regions. For example, there can be N regions 210, 220, 230. Each of regions 210, 220, 230 can be equalized sized, although region 230 might be smaller if the total size of the logical address space 200 is not an integer multiple of the region size. Each of the regions 210, 220, 230 can be further divided into a number of separate sub-regions, which can also be referred to as HPB sub-regions. In one embodiment, there can be M sub-regions in each region. For example, region 210 can include sub-regions 212, 214, 216, region 220 can include sub-regions 222, 224, 226, and region 230 can include sub-regions 232, 234, 236. Each of the sub-regions can be equalized sized, although sub-region M-1 216, 226, 236 of each region might be smaller if the region size is not an integer multiple of the sub-region size. In other embodiments, there can be some other number of regions and/or sub-regions, and the regions and/or sub-regions can have different sizes.

In one embodiment, flash-based FTL mapping table 135 maintains a number of translation layer entries corresponding to the logical address space 200. Each translation layer entry includes the physical address of a corresponding logical block address. In one embodiment, host system 120 can send a request (e.g., a HPB read buffer command) for a subset of the entries in flash-based FTL mapping table 135 and store that subset in host-resident FTL mapping table 125. In one embodiment, the translation layer entries for all of the logical block address in a given sub-region are transferred to host system 120 together in response to the request. Thus, host-resident FTL mapping table 125 can include translation layer entries for one or more sub-regions of the logical address space 200. Those sub-regions for which the translation layer entries are stored in host-resident FTL mapping table 125 are referred to as "active" sub-regions. A region of logical address space 200 can be considered active if it includes at least one active sub-region. For example, if the translation layer entries, including the corresponding physical addresses on memory device 130, corresponding to the logical addresses in sub-region 212 are cached in host-resident FTL mapping table 125, sub-region 212 and region 210 are both considered to be active.

Figure 3:
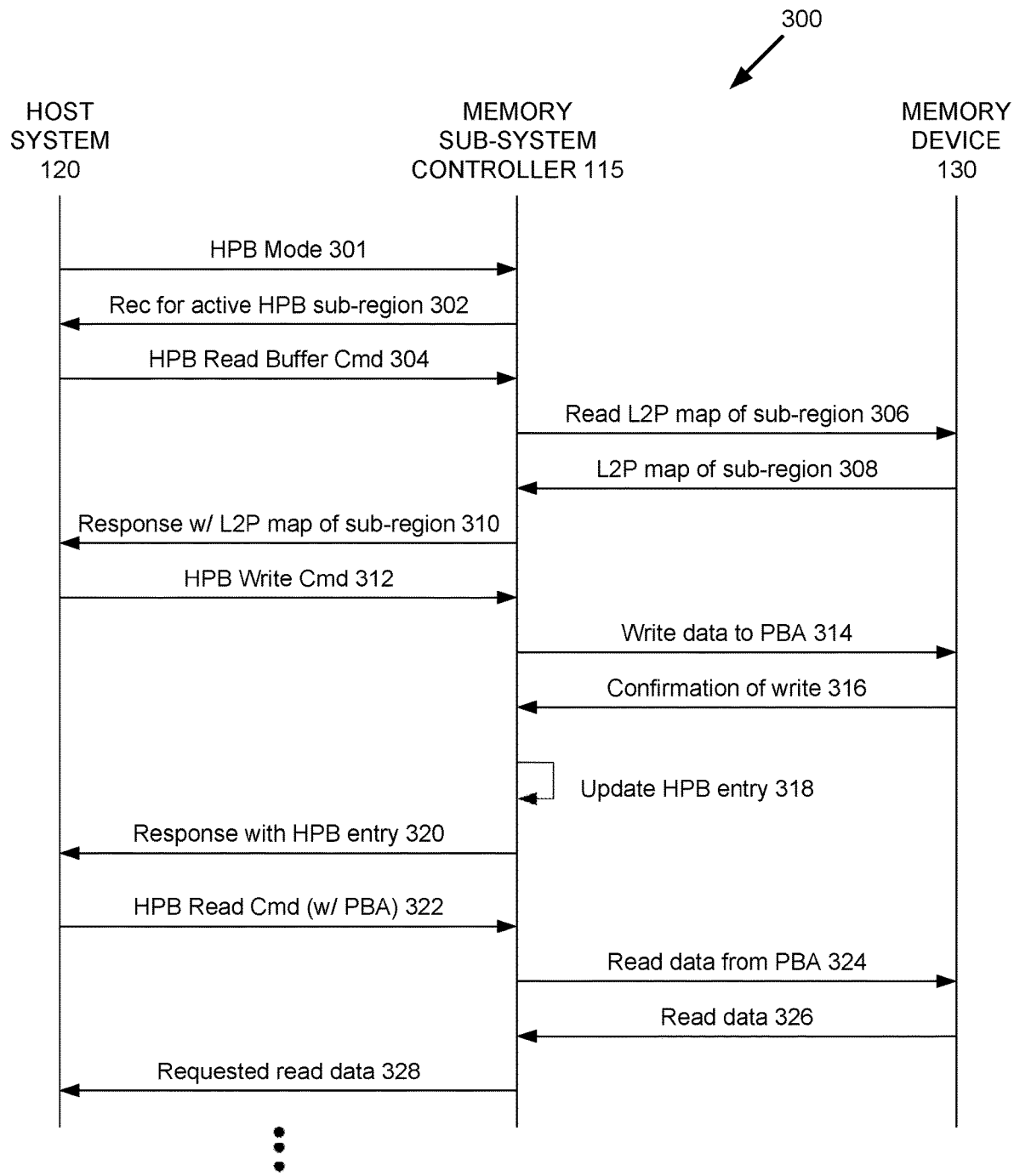
FIG. 3 is a sequence diagram illustrating operation of a memory sub-system using host-resident translation layer write commands in accordance with some embodiments of the present disclosure.

In one embodiment, when operating in a device control mode, host-resident FTL manager component 113 provides recommendations to host system 120 regarding which regions or sub-regions to active or deactivate. The recommendations can be based, for example, on the most frequently accessed logical block addresses, the most recently accessed logical block addresses, etc. In response to receiving a recommendation, the host system 120 can request the translation layer entries corresponding to the recommended region or sub-region. In another embodiment, when operating in a host control mode, host system 120 decides which region or sub-regions to activate or deactivate without input from memory sub-system 110. In one embodiment, host-resident FTL manager component 113 can receive a host-resident translation layer write command for a logical address in a non-active region or sub-region. For example, host system 120 can use the host-resident translation layer write command to request that a particular region or sub-region be activated. Host system 120 can send a host-resident translation layer write command FIG. 3 is a sequence diagram illustrating operation of a memory sub-system using host-resident translation layer write commands in accordance with some embodiments of the present disclosure. The sequence diagram 300 illustrates one embodiment of the commands and data exchanged between host system 120, memory sub-system controller 115 implementing host-resident FTL manager component 113, and memory device 130. At operation 301, host system 120 sends an indication of a mode of operation. For example, the host system 120 can indicate that it will operate in a host-resident translation layer mode of operation. This indicates that host system 120 has a host-resident FTL mapping table 125 and can store at least a sub-set of the translation layer entries from the flash-based FTL mapping table 135 of memory device 130. In one embodiment, the host system 120 can further indicate whether it will operate in a device control mode or a host control mode. When operating in device control mode, at operation 302, host-resident FTL manager component 113 can send, to host system 120, a recommendation for one or more sub-regions to activate. When operating in host control mode, host system 120 can identify the one or more sub-regions to activate itself.

At operation 304, host-resident FTL manager component 113 receives, from host system 120, a host-resident translation layer read buffer command (e.g., a HPB Read Buffer command) including an indication of one or more sub-regions of a logical address space 200 of the memory device 130. At operation 306, host-resident FTL manager component 113 performs a read operation to retrieve one or more translation layer entries stored in FTL mapping table 135 on memory device 130. Those one or more translation layer entries are associated with the one or more sub-regions of the logical address space indicated in operation 304. At operation 308, host-resident FTL manager component 113 receives the FTL mapping information including the one or more translation layer entries from memory device 130. As described above, each translation layer entry includes the physical address of a corresponding logical block address in the identified sub-regions. At operation 310, host-resident FTL manager component 113 sends, to host system 120, a response to the host-resident translation layer read buffer command. In one embodiment, the response includes the one or more translation layer entries obtained from FTL mapping table 135 on memory device 130. Host system 120 can store the one or more translation layer entries in the host-resident FTL mapping table 125.

At operation 312, host-resident FTL manager component 113 receives, from host system 120, a host-resident translation layer write command requesting that data associated with a logical block address be written to the memory device. In one embodiment, the logical block address corresponds to one of the translation layer entries stored in host-resident FTL mapping table 125. At operation 314, host-resident FTL manager component 113 performs a write operation to write the data associated with the logical block address to a physical address of memory device 130, and at operation 316, host-resident FTL manager component 113 receives a confirmation that the write operation was successfully performed (i.e., that the data was successfully stored at the physical address). At operation 318, host-resident FTL manager component 113 updates a translation layer entry corresponding to the logical block address to include the physical address where the data was written. At operation 320, host-resident FTL manager component 113 sends, to host system 120, a response to the host-resident translation layer write command. In one embodiment, the response includes the updated translation layer entry with the physical address where the data was written. Host system 120 can store the updated translation layer entry with the physical address in host-resident FTL mapping table 125. Thus, host system 120 receives the updated FTL mapping information without having to issue a separate request (e.g., a HPB Read Buffer command) to the memory sub-system 110.

At operation 322, host-resident FTL manager component 113 receives, from host system 120, a host-resident translation layer read command (e.g., a HPB Read command) including the physical address of the data on memory device 130. At operation 324, host-resident FTL manager component 113 performs a read operation to read the data stored at the physical address from memory device 130, and at operation 326 receives the request data read from memory device 130. At operation 328, host-resident FTL manager component 113 sends, to host system 120, the data read from the physical address of memory device 130. In this manner, host-resident FTL manager component 113 can perform the read operation without reading a corresponding translation layer entry stored in the FTL mapping table 135 of memory device 130.

Figure 4:
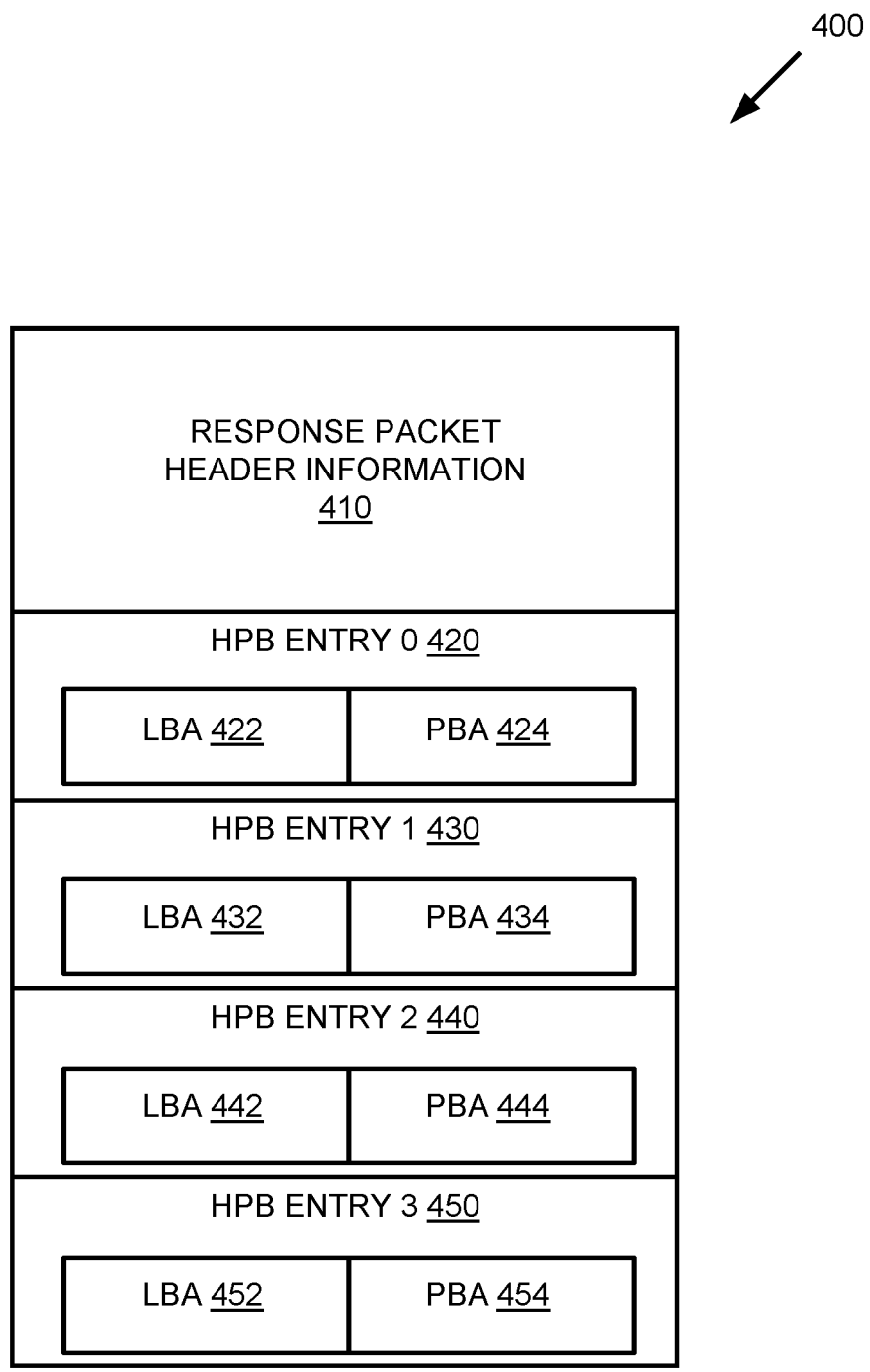
FIG. 4 is a block diagram illustrating a response packet sent in response to a host-resident translation layer write command in accordance with some embodiments of the present disclosure.

FIG. 4 is a block diagram illustrating a response packet sent in response to a host-resident translation layer write command in accordance with some embodiments of the present disclosure. In one embodiment, the response packet 400 is a universal flash storage (UFS) protocol information unit (UPIU). As described above, in response to receiving a host-resident translation layer write command and writing the data associated with a logical block address to a physical address of memory device 130, host-resident FTL manager component 113 can generate the response packet 400 and send the response packet 400 to the host system 400 as a response to the host-resident translation layer write command.

In one embodiment, the response packet 400 includes response packet header information 410, and a HPB sense data area including a number of translation layer entries (e.g., HPB entries) 420, 430, 440, and 450. The response packet header information 410 can include one or more items of identifying information, such as a packet identifier, one or more flags, a LUN identifier, a task tag, a status field, a total length field, a segment length field, device information, for example, and/or additional or different information. The HPB sense data area can include a number of translation layer entries corresponding to a chunk size of the host-resident translation layer write command. The chunk size indicates how many blocks of data are to be written in response to the host-resident translation layer write command. In one embodiment, each translation layer entry represents the FTL mapping information for one block of data (e.g., 4 kB). Thus, if the chunk size of the host-resident translation layer write command is 16 kB, four blocks of data are to be written, and response packet 400 can include four translation layer entries 420, 430, 440, and 450. In other embodiments, some other chunk size can be used, such as 32 kB, which would result in the response packet having eight translation layer entries, or 64 kB, which would result in the response packet having 16 translation layer entries.

In one embodiment, each translation layer entry includes the physical address where the data was stored. In another embodiment, each translation layer entry includes the physical address where data for a corresponding logical block address is stored, arranged as an LBA-PBA pair. For example, translation layer entry 420 includes LBA 422 and PBA 424, translation layer entry 440 includes LBA 432 and PBA 434, translation layer entry 440 includes LBA 442 and PBA 444, and translation layer entry 450 includes LBA 452 and PBA 454. In one embodiment, when host-resident FTL manager component 113 writes the data corresponding to a logical block address, such as LBA 422, of an active sub-region to a physical address of memory device 130, host-resident FTL manager component 113 further updates the corresponding translation layer entry 420 to include an indication of the physical address, such as PBA 424. This translation layer entry 420 can be referred to as an "updated" translation layer entry. In one embodiment, the PBA of each translation layer entry is encrypted or otherwise encapsulated in the entry. Thus, host-resident FTL manager component 113 can provide translation layer entries (e.g., 8 bytes) instead of just the PBA (e.g., 4 bytes) as part of the response packet 400. When generating a response to the host-resident translation layer write command, host-resident FTL manager component 113 can include the updated translation layer entry 420 in the response packet 400, along with translation layer entries corresponding to any other LBAs which were written during the write operation. Host-resident FTL manager component 113 sends, to host system 120, the response packet 400 including the updated translation layer entry or entries with the physical address or addresses of where the data was written. Host system 120 can store the update translation layer entry or entries, including the physical address or addresses, in host-resident FTL mapping table 125 and use the physical address or addresses when issuing subsequent host-resident translation layer read commands (e.g., HPB Read commands).

Figure 5:
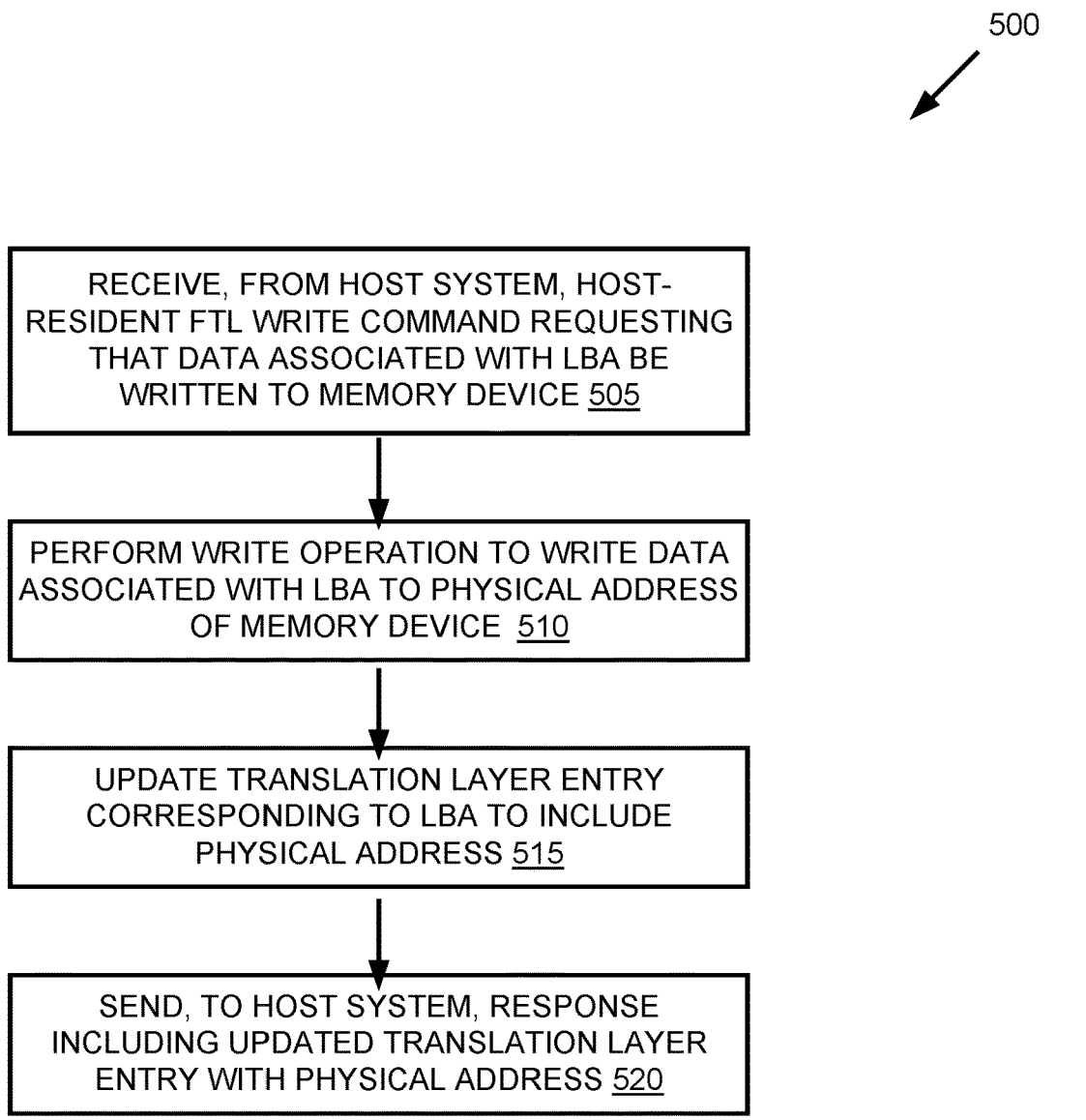
FIG. 5 is a flow diagram of an example method of processing host-resident translation layer write commands in accordance with some embodiments of the present disclosure.

FIG. 5 is a flow diagram of an example method of processing host-resident translation layer write commands in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by host-resident FTL manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic receives, from host system 120, a host-resident translation layer write command requesting that data associated with a logical block address be written to the memory device and that a physical address to which the data is written be returned in response. In one embodiment, the logical block address corresponds to one of the translation layer entries stored in host-resident FTL mapping table 125. In one embodiment, the host-resident translation layer write command includes an indication of the logical block address, the data to be written to the memory device, and an indication to differentiate the host-resident translation layer write command from a conventional write command. In one embodiment, host-resident FTL manager component 113 can identify a received write command as a host-resident translation layer write command by examining this indication. This indication, such as a bit, flag, header, unique value, unique format, etc. can indicate to host-resident FTL manager component 113 that a response, such as response packet 400 is to be generated upon performance of the write operation. A conventional write command would not cause the memory sub-system 110 to generate or send such a response. In one embodiment, the host-resident translation layer write command includes multiple logical block addresses, which can cause host-resident FTL manager component 113 to return multiple corresponding physical addresses in response.

At operation 510, the processing logic performs a write operation to write the data associated with the logical block address to a physical address of memory device 130. In one embodiment, host-resident FTL manager component 113 sends a write command to memory device 130 to cause the memory device 130 to initiate the write operation. For example, memory device 130 can identify one or more wordlines and sub-blocks of memory array 137 that correspond to an available physical address, and can apply one or more programming voltage pulses to cause a charge representing the data to be stored at the physical address. In one embodiment, host-resident FTL manager component 113 receives a confirmation that the write operation was successfully performed (i.e., that the data was successfully stored at the physical address).

At operation 515, the processing logic updates a translation layer entry (e.g., translation layer entry 420) in a translation layer table on the memory device (e.g., FTL mapping table 135) corresponding to the logical block address (e.g., LBA 422) to include the physical address (e.g., PBA 424) where the data was written. In one embodiment, host-resident FTL manager component 113 identifies the translation layer entry corresponding to the logical block address. For example, the translation layer entries in FTL mapping table 135 can be indexed by the logical block addresses. Host-resident FTL manager component 113 can further determine the physical address of the memory device 130 where the data associated with the logical block address was written. In one embodiment, memory device 130 provides the physical address to host-resident FTL manager component 113 along with the confirmation that the write operation was successfully performed. Host-resident FTL manager component 113 can update the translation layer entry by writing the physical address to the translation layer entry (e.g., overwriting a previous physical address stored in the entry). As described above, a translation layer entry (e.g., translation layer entry 420) includes a logical-to-physical address mapping such as logical block address (e.g., LBA 422) representing the data and a physical address (e.g., PBA 424) where the data is stored.

At operation 520, the processing logic sends, to host system 120, a response (e.g., response packet 400) to the host-resident translation layer write command. In one embodiment, the response packet 400 includes the updated translation layer entry with the physical address where the data was written. Host system 120 can store the updated translation layer entry with the physical address in host-resident FTL mapping table 125. Thus, host system 120 receives the updated FTL mapping information without having to issue a separate request (e.g., a HPB Read Buffer command) to the memory sub-system 110 and can use the updated FTL mapping information when subsequently issuing host-resident translation layer read commands (e.g., HPB Read commands).

Figure 6:
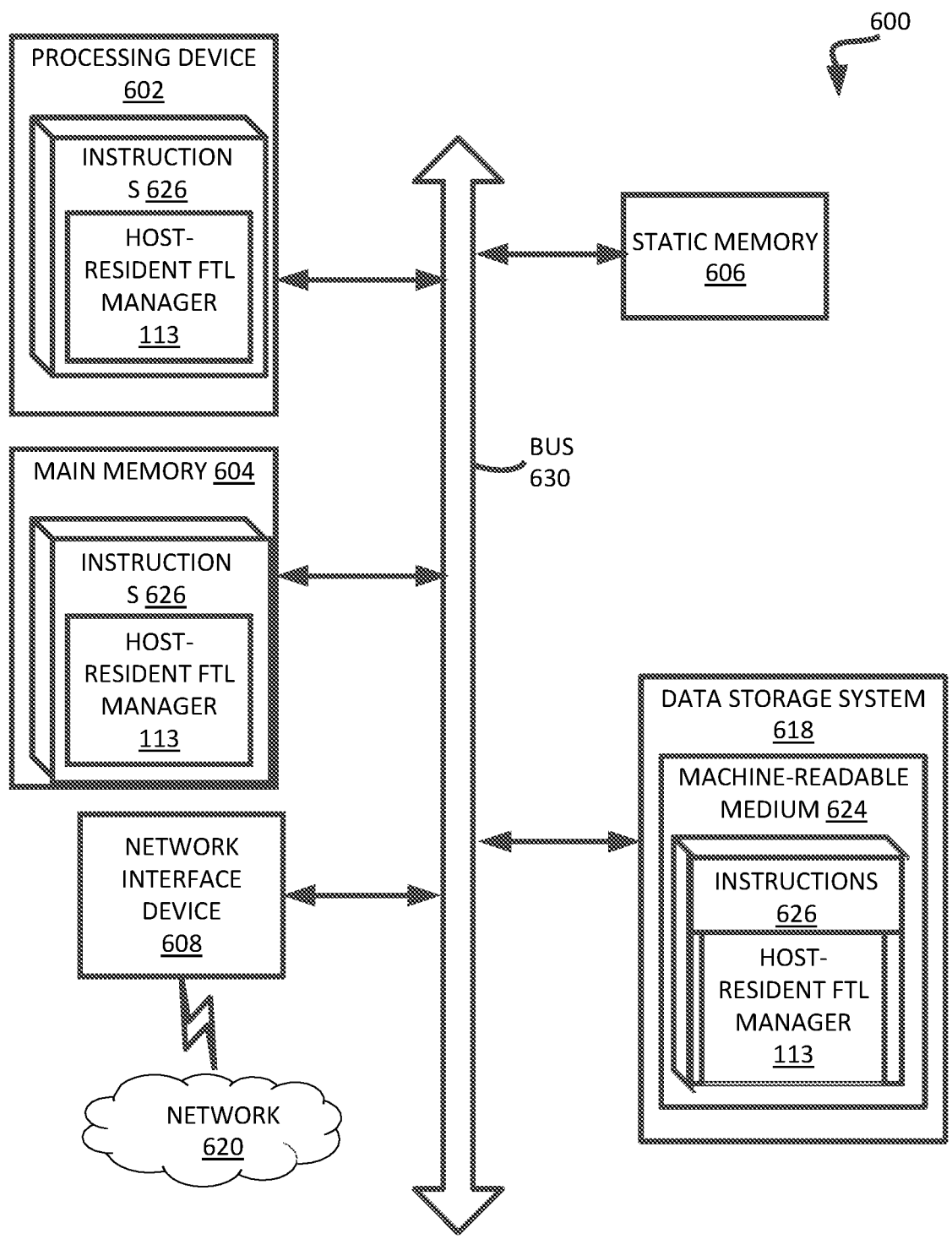
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the host-resident FTL manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium, such a non-transitory computer-readable medium) on which is stored one or more sets of instructions 626 or software embodying any one or more of the methodologies or functions described herein. In one embodiment, this medium 624 is also writable by host-resident FTL manager component 113, memory sub-system controller 115, or other components. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the host-resident FTL manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
receiving, from a host system, a host-resident translation layer read command comprising a physical address of data to be read from the memory device, wherein the physical address is indicated in at least a portion of a translation layer entry previously provided to the host system with a response to a host-resident translation layer write command and stored in a host-resident translation layer mapping table;
performing a read operation to read the data stored at the physical address from the memory device; and
sending, to the host system, the data from the physical address of the memory device.

2. The system of claim 1, wherein the host-resident translation layer write command indicated that the data associated with a logical block address be written to the memory device and that the physical address to which the data was written be returned in response.

3. The system of claim 2, wherein the logical block address is associated with an active sub-region of a logical address space of the memory device.

4. The system of claim 3, wherein one or more translation layer entries corresponding to the active sub-region of the logical address space are stored in the host-resident translation layer mapping table.

5. The system of claim 1, wherein the processing device to perform further operations comprising:
performing the read operation to read the data stored at the physical address from the memory device without reading a corresponding translation layer entry stored in a translation layer mapping table on the memory device.

6. The system of claim 1, wherein the processing device to perform further operations comprising:
receiving, from the host system, an indication of a host-resident translation layer mode of operation.

7. The system of claim 1, wherein the processing device to perform further operations comprising:
sending, to the host system, a recommendation for one or more sub-regions of a logical address space of the memory device to activate.

8. A method comprising:
receiving, from a host system, a host-resident translation layer read command comprising a physical address of data to be read from a memory device, wherein the physical address is indicated in at least a portion of a translation layer entry previously provided to the host system with a response to a host-resident translation layer write command and stored in a host-resident translation layer mapping table;
performing a read operation to read the data stored at the physical address from the memory device; and
sending, to the host system, the data from the physical address of the memory device.

9. The method of claim 8, wherein the host-resident translation layer write command indicated that the data associated with a logical block address be written to the memory device and that the physical address to which the data was written be returned in response.

10. The method of claim 9, wherein the logical block address is associated with an active sub-region of a logical address space of the memory device.

11. The method of claim 10, wherein one or more translation layer entries corresponding to the active sub-region of the logical address space are stored in the host-resident translation layer mapping table.

12. The method of claim 8, wherein the processing device to perform further operations comprising:
performing the read operation to read the data stored at the physical address from the memory device without reading a corresponding translation layer entry stored in a translation layer mapping table on the memory device.

13. The method of claim 8, further comprising:
receiving, from the host system, an indication of a host-resident translation layer mode of operation.

14. The method of claim 8, perform further comprising:
sending, to the host system, a recommendation for one or more sub-regions of a logical address space of the memory device to activate.

15. A non-transitory computer-readable storage medium comprising instructions that, when executed by a processing device, cause the processing device to perform operations comprising:
receiving, from a host system, a host-resident translation layer read command comprising a physical address of data to be read from a memory device, wherein the physical address is indicated in at least a portion of a translation layer entry previously provided to the host system with a response to a host-resident translation layer write command and stored in a host-resident translation layer mapping table;
performing a read operation to read the data stored at the physical address from the memory device; and
sending, to the host system, the data from the physical address of the memory device.

16. The non-transitory computer-readable storage medium of claim 15, wherein the host-resident translation layer write command indicated that the data associated with a logical block address be written to the memory device and that the physical address to which the data was written be returned in response.

17. The non-transitory computer-readable storage medium of claim 16, wherein the logical block address is associated with an active sub-region of a logical address space of the memory device.

18. The non-transitory computer-readable storage medium of claim 17, wherein one or more translation layer entries corresponding to the active sub-region of the logical address space are stored in the host-resident translation layer mapping table.

19. The non-transitory computer-readable storage medium of claim 15, wherein the instructions cause the processing device to perform further operations comprising:
performing the read operation to read the data stored at the physical address from the memory device without reading a corresponding translation layer entry stored in a translation layer mapping table on the memory device.

20. The non-transitory computer-readable storage medium of claim 15, wherein the instructions cause the processing device to perform further operations comprising:
receiving, from the host system, an indication of a host-resident translation layer mode of operation.

\* \* \* \* \*